United States Patent [19]
Johann et al.

[11] Patent Number: 5,355,356
[45] Date of Patent: Oct. 11, 1994

[54] CHARGE PUMP FOR RESTORING DC IN AN OPTICAL RECORDING READ CHANNEL

[75] Inventors: Donald F. Johann, Palo Alto; John E. DeFiore, Sunnyvale, both of Calif.

[73] Assignee: Maxoptix Corporation, San Jose, Calif.

[21] Appl. No.: 63,907

[22] Filed: May 19, 1993

[51] Int. Cl.$^5$ .......................... G11B 5/76; G11B 5/09; H04N 5/76
[52] U.S. Cl. ........................................ 369/59; 360/51
[58] Field of Search ............................ 369/59, 116, 48; 235/455, 463, 472, 462; 370/110.1; 381/94; 360/51

[56] References Cited

U.S. PATENT DOCUMENTS

| | | | |
|---|---|---|---|
| 4,219,152 | 8/1980 | Couch et al. | 235/463 |
| 4,356,389 | 10/1982 | Quirey et al. | 235/455 |
| 4,635,255 | 1/1987 | Clark et al. | 370/110.1 |
| 5,021,747 | 6/1991 | Isham et al. | 330/284 |
| 5,061,843 | 10/1991 | Sato et al. | 235/472 X |
| 5,184,343 | 2/1993 | Johann et al. | 369/116 |
| 5,263,091 | 11/1993 | Waller | 381/94 |

Primary Examiner—John Shepperd
Assistant Examiner—Patrick Wamsley
Attorney, Agent, or Firm—Blakely, Sokoloff, Taylor & Zafman

[57] ABSTRACT

An optical recording system having a DC restored read signal for qualifying pulses in the read channel. The equalized and filtered read signal is input to a differentiator and a DC restore circuit. The zero crossings of the differentiated signal which represent the peaks of the pulses are detected. The DC restore circuit inverts the read signal, generates a reference voltage, and compares the negative pulses peaks of the read signal to the reference voltage. The charge of a capacitor is adjusted according to the difference in voltages of the pulse peaks to that of the reference voltage in order to maintain a constant DC level. The DC restored signal is qualified according to a threshold. Only those pulses which have zero crossings and which have been qualified are considered to be valid.

17 Claims, 7 Drawing Sheets

CHARGE PUMP FOR RESTORING DC IN AN OPTICAL RECORDING READ CHANNEL

FIELD OF THE INVENTION

The present invention pertains to the field of optical recording devices. More specifically, the present invention relates to a DC restored read channel in an optical recording device.

BACKGROUND OF THE INVENTION

Today, optical-based data storage systems are commercially competitive due to their high storage density, relatively low cost, and random access capability. Moreover, magneto-optical data storage systems offer the added flexibility of allowing an optical medium to be erased and new data written in place of the erased section. This feature grants a user the capability to reuse an optical medium many times over by erasing old data and substituting new data in place thereof.

Basically, magneto-optical recording operates in the following manner. Data are stored as a series of binary bits (i.e., 1s and 0s). A laser beam is focused onto an optical medium, usually by means of a lens assembly. Initially, the optical medium is perpendicularly magnetized in one direction. To write a "1," the laser beam is pulsed at a high power for a short duration. This raises the temperature of the optical medium to such a degree that an externally applied magnetic field reverses the direction of magnetization in the heated region. When the medium returns to its lower ambient temperature, the "domain" retains its reversed magnetization.

The domains are "erased" by using the laser to perform the same thermal process used to write the data, except that an oppositely directed external magnetic field is applied. Thereby, the domains revert back to their original magnetization.

The stored data are read from the optical medium based on the Kerr effect. This principle states that linearly polarized light, reflected from a perpendicularly magnetized medium, is rotated according to the direction of magnetization. Hence, the magnetization transitions of the domains stored on the medium can be read by determining the direction of the plane of polarization of the reflected light. The same laser used to write the data is also used to generate the reflected light for reading the stored data, except that its power is reduced to avoid inadvertently writing data onto the medium.

An encoding scheme is implemented in order to map the data into a pattern which is compatible with recording media data disks. In other words, the encoding scheme enables the magneto-optical disk drive system to physically distinguish between each of the bits stored on the track. A popular encoding scheme is 2,7 encoding. The 2,7 encoding scheme specifies that there should be a minimum of two and a maximum of seven "0s" between each pair of "1s." Hence, the spatial frequency of the domains depend upon the particular sequence of digital data written the medium.

The magneto-optical disk drive converts these domains into an electrical signal, wherein each read back domain produces a corresponding electrical pulse. As the domains are written closer together, the amplitude of the corresponding electrical signals starts to diminish due to intersymbol interference. As a result, the amplitude of the read signal is proportional to the spatial frequency of the domains. The higher the spatial frequency, the lower the corresponding electrical signal's amplitude becomes.

Figure 1:
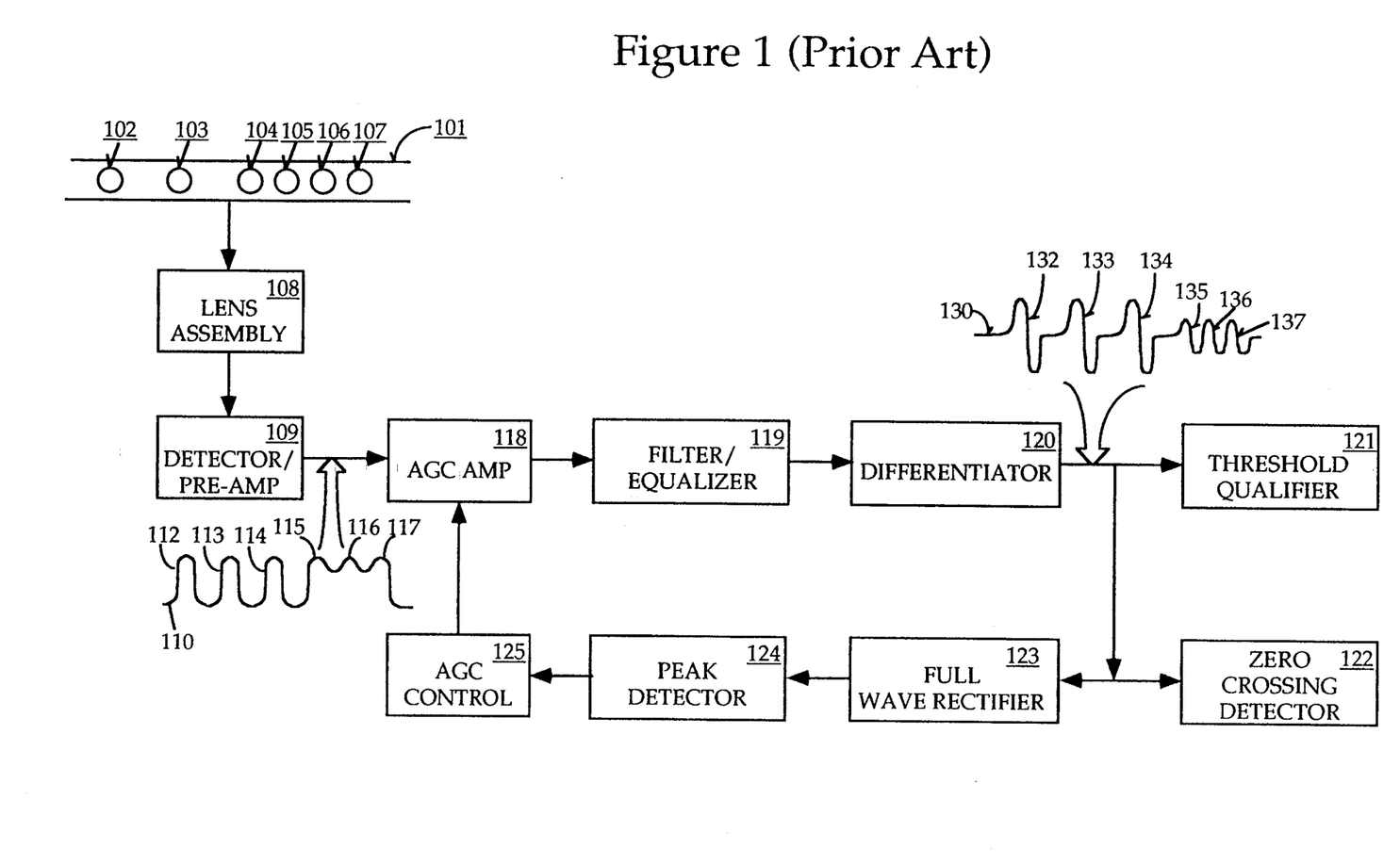
FIG. 1 is a block diagram of a prior art read channel of a magneto-optical disk drive system.

FIG. 1 is a block diagram of a prior art read channel of an magneto-optical disk drive system. A laser beam is directed onto track 101 of an optical disk by lens assembly 108. The laser beam is modulated and reflected back to detector 109, which converts the beam into an electrical signal 110. Note that the amplitudes for pulses 112–114 corresponding to domains 102–104 are greater than the amplitudes of pulses 115–117 corresponding to the more closely spaced domains 105–107.

The electrical signal 110 is then amplified/attenuated by an automatic gain control circuit 118. The signal is then filtered, and the high frequency components are equalized by block 119. Thereafter, the peaks of each of the pulses 112–117 are detected by taking the derivative of signal 110 and determining the zero crossings of the negative slopes. These functions are performed by differentiator 120 and zero crossing detector 122. The output from differentiator 120, given an input signal 110, is shown as derivative signal 130. Note that the zero crossings 132–137 correspond to the peaks of pulses 112–117. The derivative signal 130 is fed back through full wave rectifier 123, peak detector 124, and AGC control 125 to the AGC amplifier 118.

The pulses represented by derivative signal 130 from differentiator 120 are also qualified by requiring that they exceed a certain threshold level by the threshold qualifier block 121. This is implemented in order to prevent baseline noise such as media noise, laser noise, etc., from falsely triggering zero crossings.

One problem with the typical prior art read channel described above arises from the fact that in optical recording the signal read from the optical media contains DC components. Further complicating matters is the fact that the various stages of the read channel are typically AC coupled in order to achieve high bandwidth. This AC coupling causes the average voltage level to change, depending on the DC component. Thus, the average signal level is varying according to the read pattern. The read pattern is a function of the user data, encoding scheme, etc. To get around this problem, differentiation is performed prior to threshold qualification thereby removing the DC content of the signal. However, differentiation introduces additional noise to the system. In particular, the differentiation boosts the high frequency noise. This may lead to false or missed qualifications of zero crossings. In addition, equalization produces sidelobes upon differentiation. These sidelobes tend to reduce the noise margin, thereby rendering the read channel more susceptible to errors due to noise. One cannot simply restore the DC level to some baseline value because the higher frequency components of the read signal do not return to the baseline due to intersymbol interference. These problems are becoming even more acute as areal densities continue to increase.

Thus, there is a need in the prior art for a more robust threshold and qualification scheme. It would be preferable if such a scheme could efficiently and reliably restore the DC level to the signal from the optical disk. The restored signal could then be used to establish a threshold which could then be used in conjunction with the restored signal to qualify pulses.

SUMMARY AND OBJECTS OF THE INVENTION

In optical disk drive read channels, the signal read from the surface of the optical disk consists of a series of pulses representing digitally coded information stored on the disk. In order to recover this information, it is necessary to accurately determine when the peaks of the readback signal occur in time.

In the present invention, this is accomplished by inputting the filtered and equalized read signal to both a differentiator and a DC restore circuit. The zero crossings of the differentiated read signal corresponding to the peaks of each pulse of the read signal are detected. The DC restore circuit restores a DC level to an AC coupled read signal. The pulses of the DC restored signal are qualified against a threshold level in order to reject spurious pulses from the zero crossing detector attributable to noise. The digital signal output from the zero crossing detector is ANDed with the digital signal from the threshold qualifier. A read pulse is considered to be valid only when a zero crossing is detected for that pulse and the DC restored pulse has been qualified. Thereby, valid pulses can be distinguished over spurious pulses attributable to noise.

There are many ways in which the read signal can be restored to a constant DC level. In the currently preferred embodiment, the present invention inverts the read signal. The negative peaks (i.e., the troughs) of the inverted read signal are compared against a reference voltage. The difference in their voltages is amplified. This amplified difference voltage is used to control a bidirectional current source. If the envelope of the negative peaks falls below the reference voltage, the current source supplies more current to a coupling capacitor. Conversely, if the envelope of the negative peaks is greater than that of the reference voltage, the current source sinks current away from the coupling capacitor. Thereby, the charge on the capacitor is changed to maintain the negative peaks of the signal at a constant DC level, without distorting the pulses of the original read signal.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In an optical disk drive system, an apparatus and method for restoring the DC level of the read channel for performing threshold qualification. In the following description, numerous specific details such as voltages, waveforms, timing diagrams, etc., are set forth in order to provide a thorough understanding of the present invention. It will be obvious, however, to one skilled in the art that the present invention may be practiced without these specific details. In other instances, well-known structures and devices are shown in block diagram form in order to avoid unnecessarily obscuring the present invention.

Figure 2:
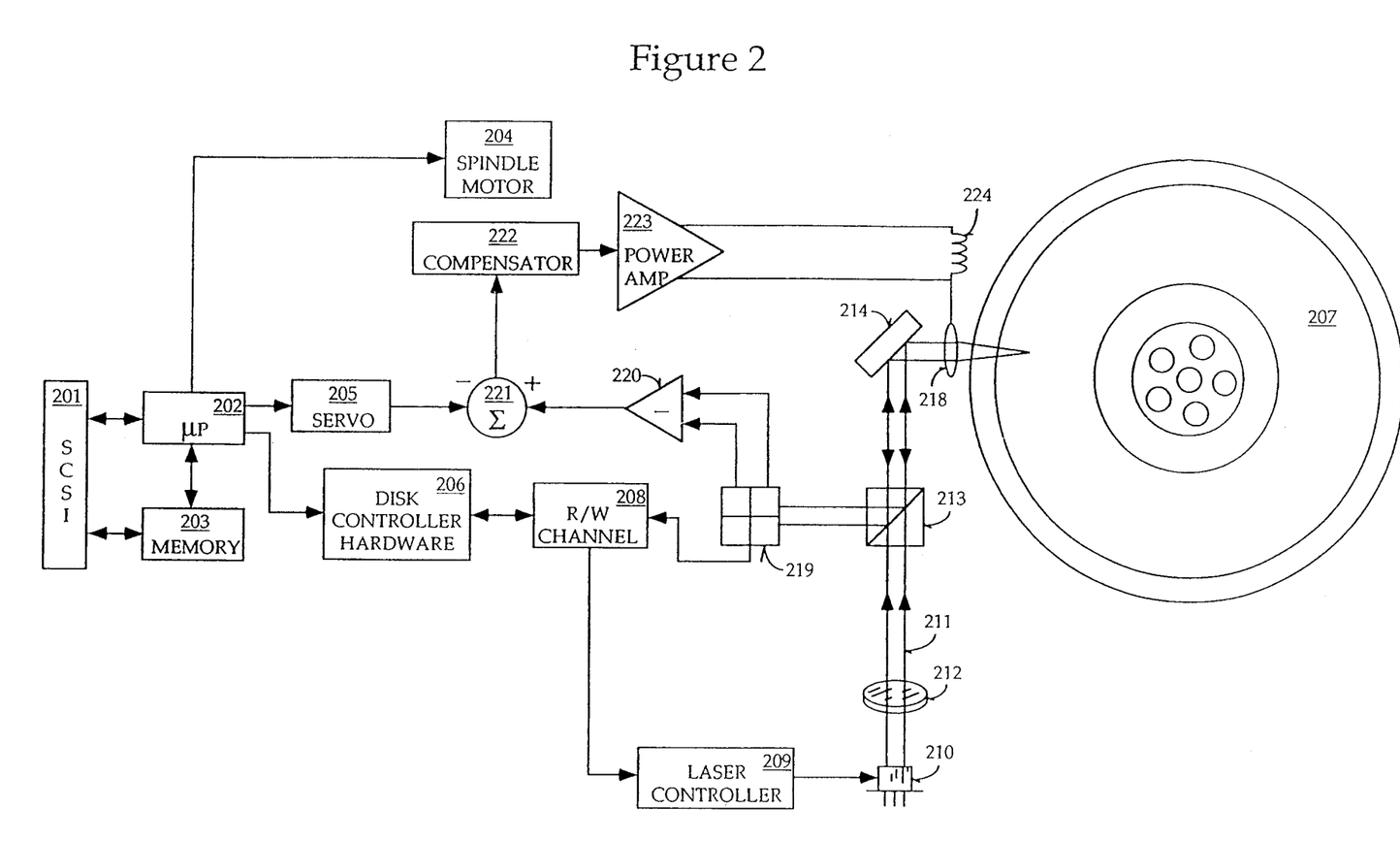
FIG. 2 illustrates an optical disk drive upon which the present invention may be practiced.

Referring to FIG. 2, an optical disk drive upon which the present invention may be practiced is shown. The optical recording system can include a small computer standard interface (SCSI) 201, which provides an interface between the optical recording system and external equipment, such as a computer. The SCSI interface 201 is coupled to a microprocessor 202 and to memory 203. Microprocessor 202 is coupled to and controls the spindle motor 204, servo mechanism 205, and disk controller hardware 206 per a program stored in memory 203. Spindle motor 204 rotates disk 207 about a spindle. Servo mechanism 205 generates a servo signal which instructs the actuator system on the positioning of the read/write light beam for performing a seek. Disk controller hardware 206 receives data signals read from the medium 207 through read/write channel 208. The read data are converted into a byte format and are transmitted to the host computer via SCSI 201.

When data are to be written to medium 207, the disk controller hardware 206 converts the data into a format compatible for storage, such as a 2,7 encoding scheme. The data signal is sent to read/write channel 208 which instructs laser controller 209 to control the power of laser pen 210. By controlling the spindle motor 204, servo 205, and laser 210, the microprocessor 202 can effectively perform seeks to different tracks for read/write operations.

Laser pen 210 emits light which is manipulated by collimator 212 into a beam 211. The collimated light beam 211 passes through beam splitter 213 and relay lens 214. An objective lens 218 focuses the light beam to a spot directed on the surface of medium 207. The modulated light reflected back from medium 207 passes through objective lens 218 and is reflected back through relay lens 214 towards beam splitter 213. The function of beam splitter 213 is to route the reflected light to data and servo detector 219, instead of back to collimator 212 and laser pen 210. Detector 219 converts the light reflected from medium 207 into an electrical signal. This resultant electrical signal contains data stored on the medium 207. It is sent via read/write channel 208 to disk controller hardware 206, which converts it into a byte format recognized by the host computer.

The electrical signal from detector 219 also contains information regarding the position of the light beam spot. The electrical signal output from detector 219 is a function of the relative difference of the position of the light beam's spot to the nearest track center. This electrical signal is known as the tracking error signal (TES). The TES is amplified by difference amplifier 220. The amplified TES signal input to summer 221 is with the servo signal provided by servo mechanism 205. Hence, the signal output from summer 221 represents the difference in distance between the present physical location of the spot relative to that of the destination track. The signal output from summer 221 is input to a loop compensator 222 which is used to determine the proper amount of current required to drive the galvo tracking motor coil 224. Power amplifier 223 is used to amplify the signal from compensation network 222 to the galvo motor coil 224.

Figure 3:
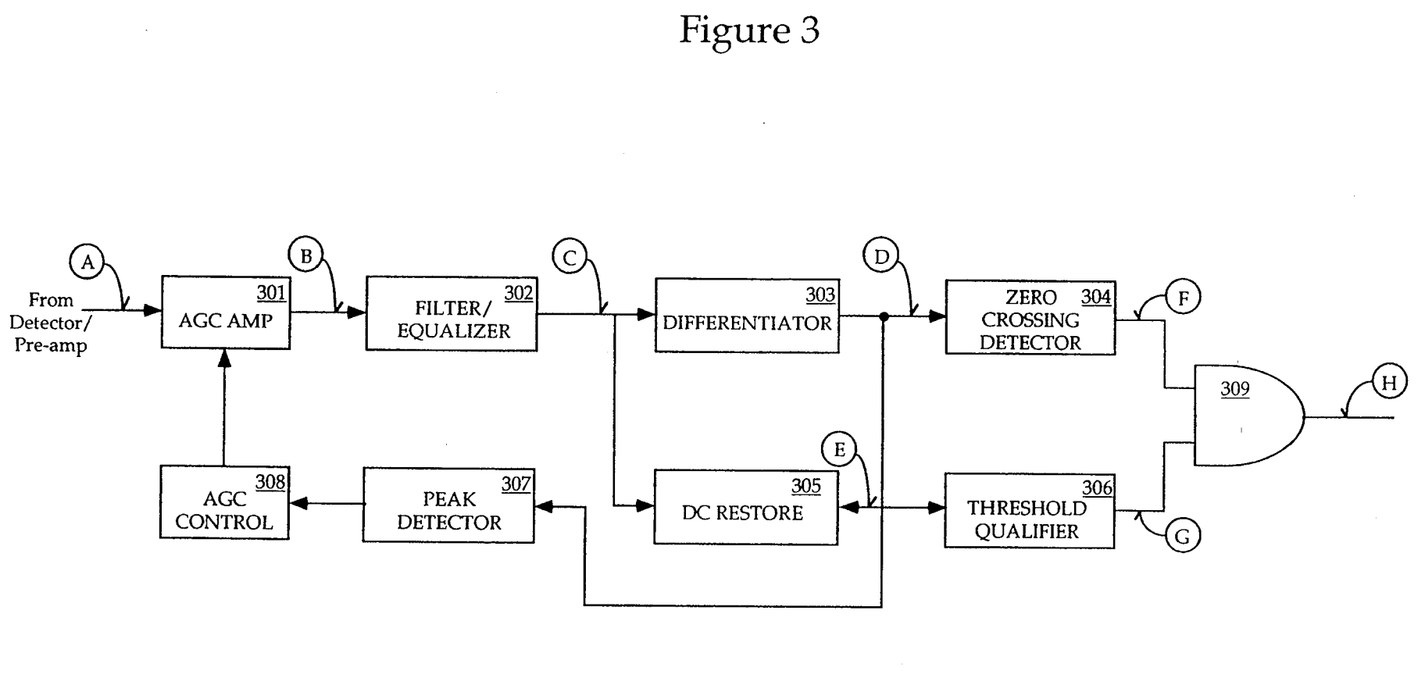
FIG. 3 is a block diagram of a read channel of the present invention.

FIG. 3 is a block diagram of a read channel of the present invention. The electrical signal from the detector/pre-amp, which contains the pulses read from the optical disk, is input to the automatic gain circuit (AGC) amplifier 301. The amplified/attenuated electrical signal from AGC amplifier 301 is input to the filter/equalizer block 302. The filter/equalizer block 302 contains a bandpass filter. The high frequency components of the electrical signal are boosted by the equalizer. The processed electrical signal is then input to both differentiator 303 and DC (direct current) restore block 305.

Differentiator 303 produces a derivative signal of the input electrical signal. The derivative signal is input to both the zero crossing detector 304 and the peak detector 307. The zero crossing detector 304 detects each occurrence when the electrical signal crosses the baseline. Zero crossing detector 304 outputs a digital signal which goes high (e.g., +5 volts) each time a zero crossing is detected. The digital signal from zero crossing detector 304 is input to AND gate 309. The peak detector 307 detects the positive peaks of the derivative signal. Based on the peak values received from peak detector 307, the AGC control block 308 controls the operation of the AGC amplifier 301. Essentially, the peak detector 307 and AGC controller 308 act as a feedback loop to maintain the peaks of the pulses at a constant level.

The filtered and equalized electrical signal from block 302 is restored to a DC level by DC restore block 305. The DC restored signal is qualified by threshold qualifier 306. Only those signals equal to or falling below the predetermined threshold are qualified. Thereby, noise is rejected. The output from threshold qualifier 306 is a digital signal which goes high whenever the signal meets the threshold requirement.

AND gate 309 performs an AND operation on the digital signals generated by zero crossing detector 304 and threshold qualifier 306. Thus, the output from AND gate 309 is a digital signal which goes high only if a zero crossing is detected and if the signal passes the threshold qualification criterion. Additional signal processing is performed by the optical disk drive before the digital signal is sent to the host computer.

Figure 4:
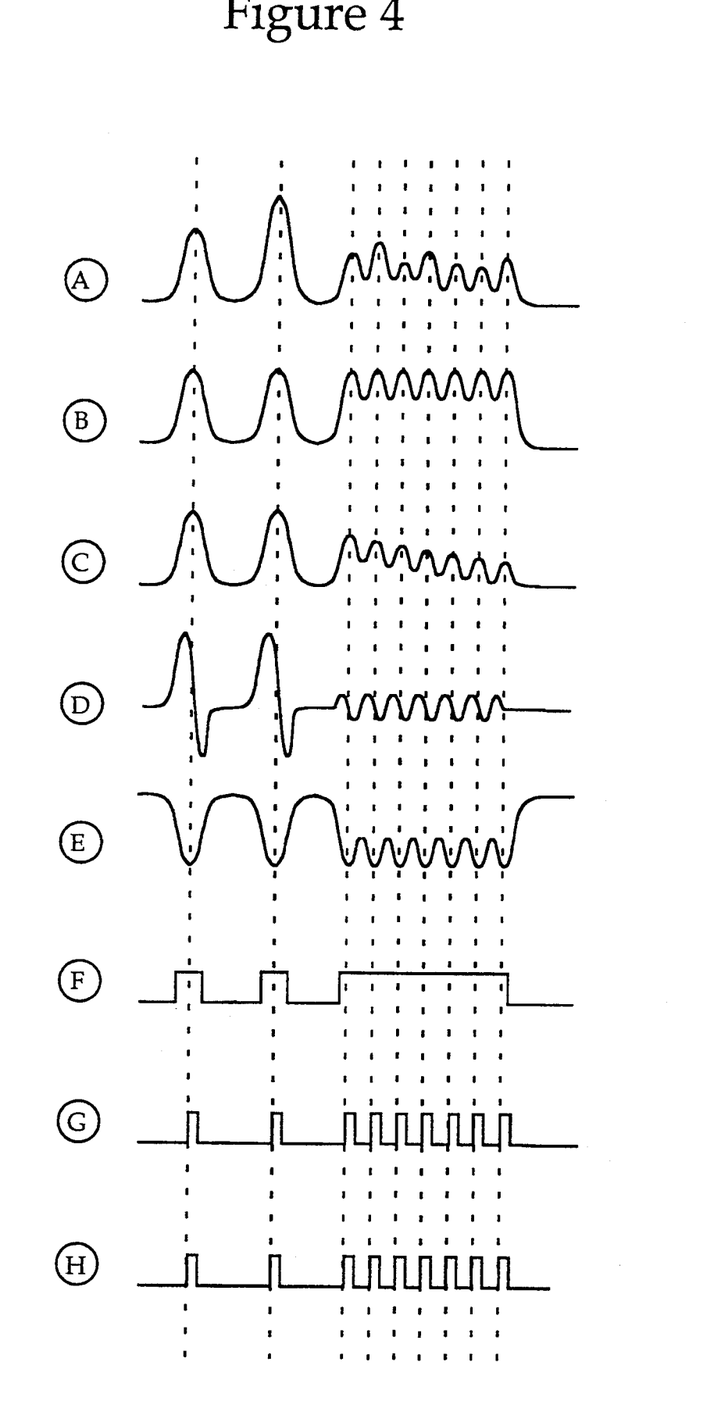
FIG. 4 is a timing diagram illustrating the waveforms of a sample signal read from the optical disk at various points of the read channel.

FIG. 4 is a timing diagram illustrating the waveforms of a sample signal read from the optical disk at various points of the read channel. The signal A read off the optical disk from the detector has pulses with differing amplitudes. The amplitudes of the pulses depend upon how hard the data were written onto the medium. Larger domains result in greater amplitudes whereas weakly written data have smaller amplitudes. The AGC amplifier 302 controls the amplitudes of the pulses in an effort to produce an even reference voltage for the peaks of each pulse. It should be noted that the AGC operates over a relatively long time period (e.g., 10–20 bits), rather than adjusting the amplitude of each individual bit. Ideally, the peaks of the pulses should be uniform, as shown in signal B.

Once the pulses are filtered and equalized, it can be seen that the waveform of signal C starts to decay. This is due to the AC coupling between the detector-AGC amplifier, AGC amplifier-filter, and filter-equalizer. In order to achieve high bandwidth, the segments of the read channel are capacitively coupled together.

Signal D shows the signal once it has been differentiated. The signal is differentiated in order to detect the peaks of each pulse. Each time the negative slope of the differentiated signal D crosses the zero reference, this corresponds to the peak of a pulse. The zero crossing detector generates a digital signal G based on the zero crossings. Note that each high bit of signal G corresponds to a peak pulse of input signal A.

The filtered and equalized signal is also DC restored. The DC restored signal F is basically generated by inverting signal C and restoring the formerly positive peaks to a fixed DC level. Each time the DC restored signal E falls below a predetermined threshold level (e.g., 50% of peak value), then a high voltage level (e.g., +5 volts) is output. Otherwise, a low voltage level (e.g., 0 volts) is output. The resulting signal output by the threshold qualifier is shown as F.

Only when signals F and G both go high, indicating the detection of a pulse peak and which is also qualified, does the AND gate output a high signal. For example, signal H is the AND operation performed on signals D and E.

Figure 5:
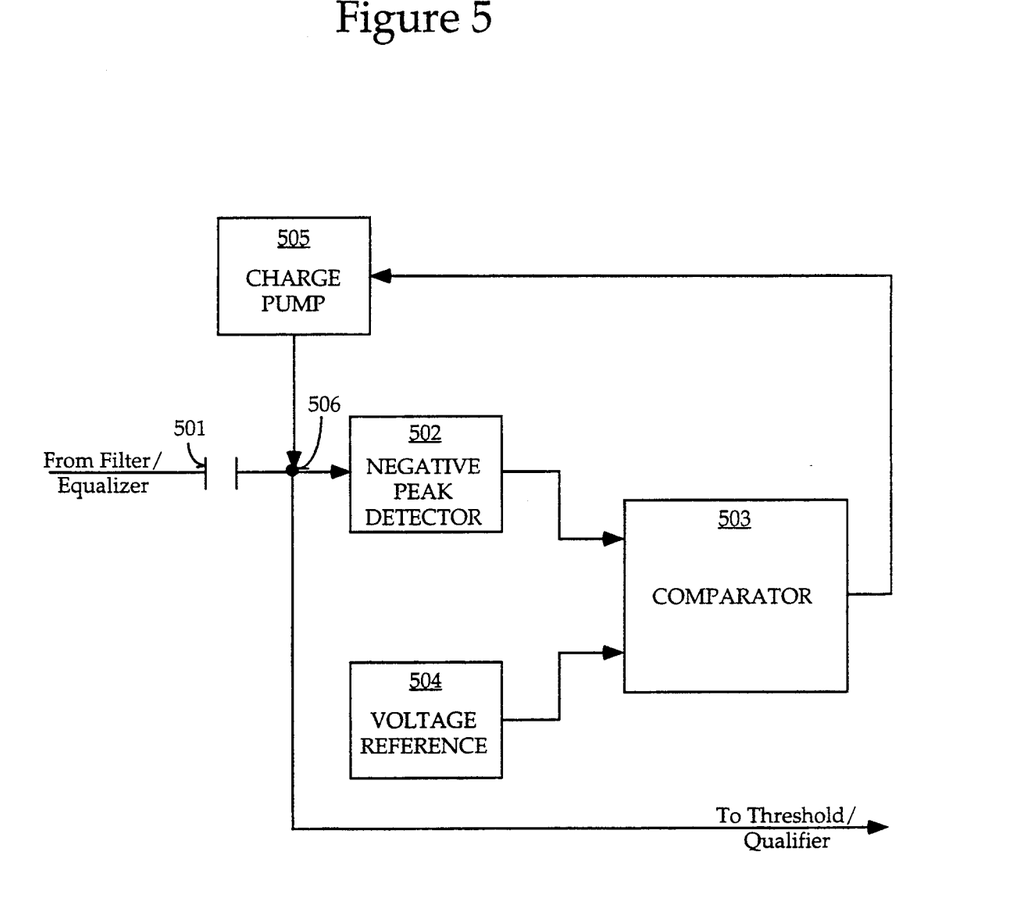
FIG. 5 is a block diagram illustrating one embodiment of a DC restore circuit used in the optical read channel of the present invention.

FIG. 5 is a block diagram illustrating one embodiment of a DC restore circuit used in the optical read channel of the present invention. The read signal from the channel filter/equalizer is AC coupled by capacitor 501 as an input to the DC restore circuit. Note that the pulse waveform is kept differential through the entire channel. By using the negative part of the differential signal, the read signal effectively becomes "inverted." The AC coupled signal is fed into negative peak detector 502. Note that the average level of the signal is changing relative to the signal's frequency. The negative peak detector 502 charges to a voltage level approximately equal to the bottom of the pulses' peaks. The discharge rate of peak detector 502 is set to track variations in the envelope of the signal, but not the individual data pulses. The changes in the pattern envelope is on the order of tens of kilohertz while the bandwidth of the signal is approximately 3–15 megahertz. The peak detector 502 charges to a voltage level approximately equal to the peaks of the signal pulses. That value is held for a given time constant. The time constant is set to track the envelope of the signal as its DC level changes, but the time constant is not set so fast as to discharge between each pulse. Essentially, the time constant is set so that the DC restore circuit corrects for shifts in the DC voltage without distorting the signal itself. This also allows for rejection of defects which do not have a duration long enough to appreciably affect the restored DC level. In the currently preferred embodiment of the present invention, the time constant is set to approximately 16 kHz.

The output from negative peak detector 502 is input to comparator 503. Comparator 503 compares the signal from negative peak detector 502 to a reference voltage supplied by voltage reference block 504. In the currently preferred embodiment, the reference voltage is set at approximately 5 volts.

Comparator 503 is comprised of a difference amplifier which amplifies the difference in voltages between the reference voltage and the peaks of the read signal. It is important that the difference amplifier have a relatively large gain bandwidth product in order to restore the signal rapidly, while maintaining enough open loop gain to restore accurately.

The amplified difference signal from comparator 503 is used to drive the charge pump 505. Charge pump 505 is basically a bidirectional current source which adds to or subtracts from the charge of capacitor 501 at node 506 in order to maintain the peaks of the pulses at the reference voltage level. The signal at node 506 is output from the DC restore circuit and sent to the threshold qualifier, whereupon, a threshold for qualification is set at an appropriate level between the DC restored peaks and the signal baseline. In the currently preferred embodiment, the threshold is set at approximately 50% of the level (i.e., midway) between the DC restored peaks and baseline.

Figure 6:
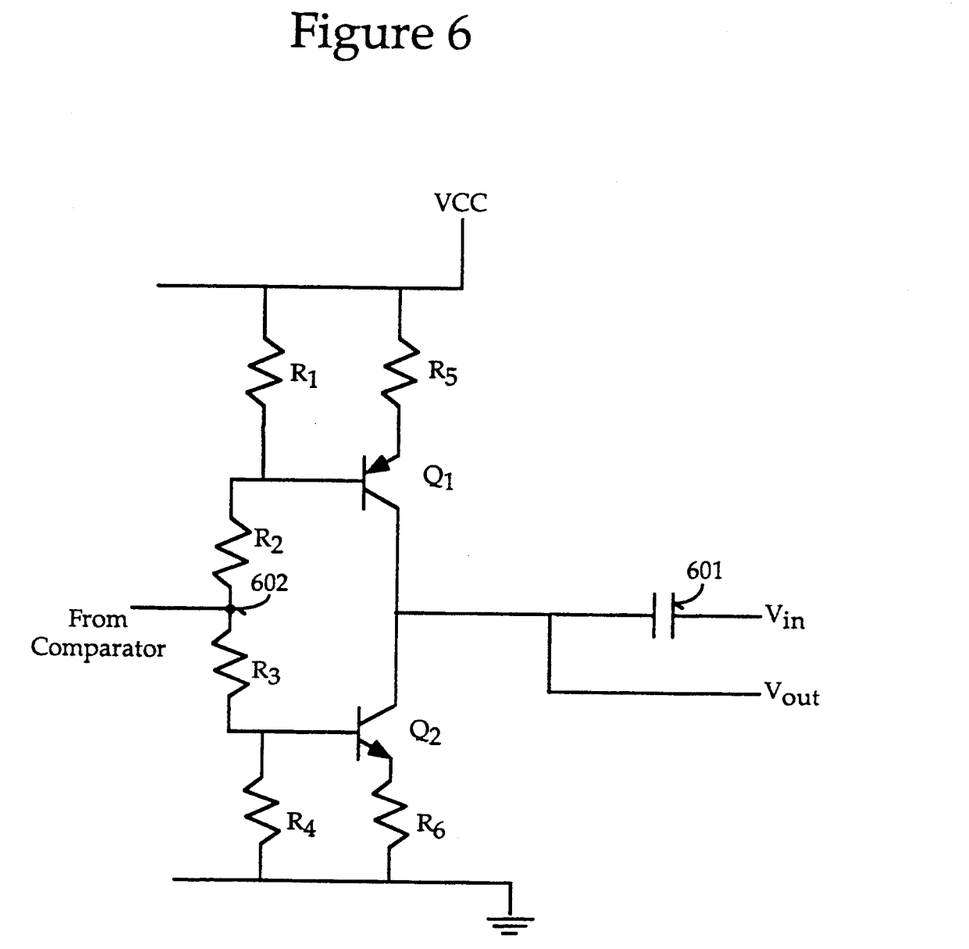
FIG. 6 is a circuit diagram illustrating the charge pump.

FIG. 6 is a circuit diagram illustrating the charge pump. The read signal from the filter/equalizer, $V_{in}$, is input to capacitor 601. The output signal, $V_{out}$, is taken from the other side of capacitor 601. The difference signal from the comparator is coupled to node 602. $Q_1$ is a PNP transistor whose emitter is coupled through resistor $R_5$ to $V_{cc}$. $Q_2$ is an NPN transistor whose emitter is coupled to ground through resistor $R_6$. Resistors $R_1$ and $R_2$ are used to bias the base of transistor $Q_1$. Similarly, resistors $R_3$ and $R_4$ are used to bias the base of transistor $Q_2$.

The charge pump operates as follows. When the difference voltage at node 602 is halfway between the supply rails, the collector of transistor $Q_1$ sources the same amount of current as transistor $Q_2$ sinks. Under that condition, no net current flows into coupling capacitor 601. If the difference voltage rises above the midpoint, transistor $Q_2$ begins to sink more current, and transistor $Q_1$ sources less current. The result is to sink current from capacitor 601. Conversely, if the difference voltage is less than the midpoint value, transistor $Q_2$ sinks less current, while transistor $Q_1$ sources more current. The net effect is that more current is sourced to capacitor 601. It should be noted that the current source is inside the closed feedback loop so as to minimize nonlinearalities or offsets.

Figure 7:
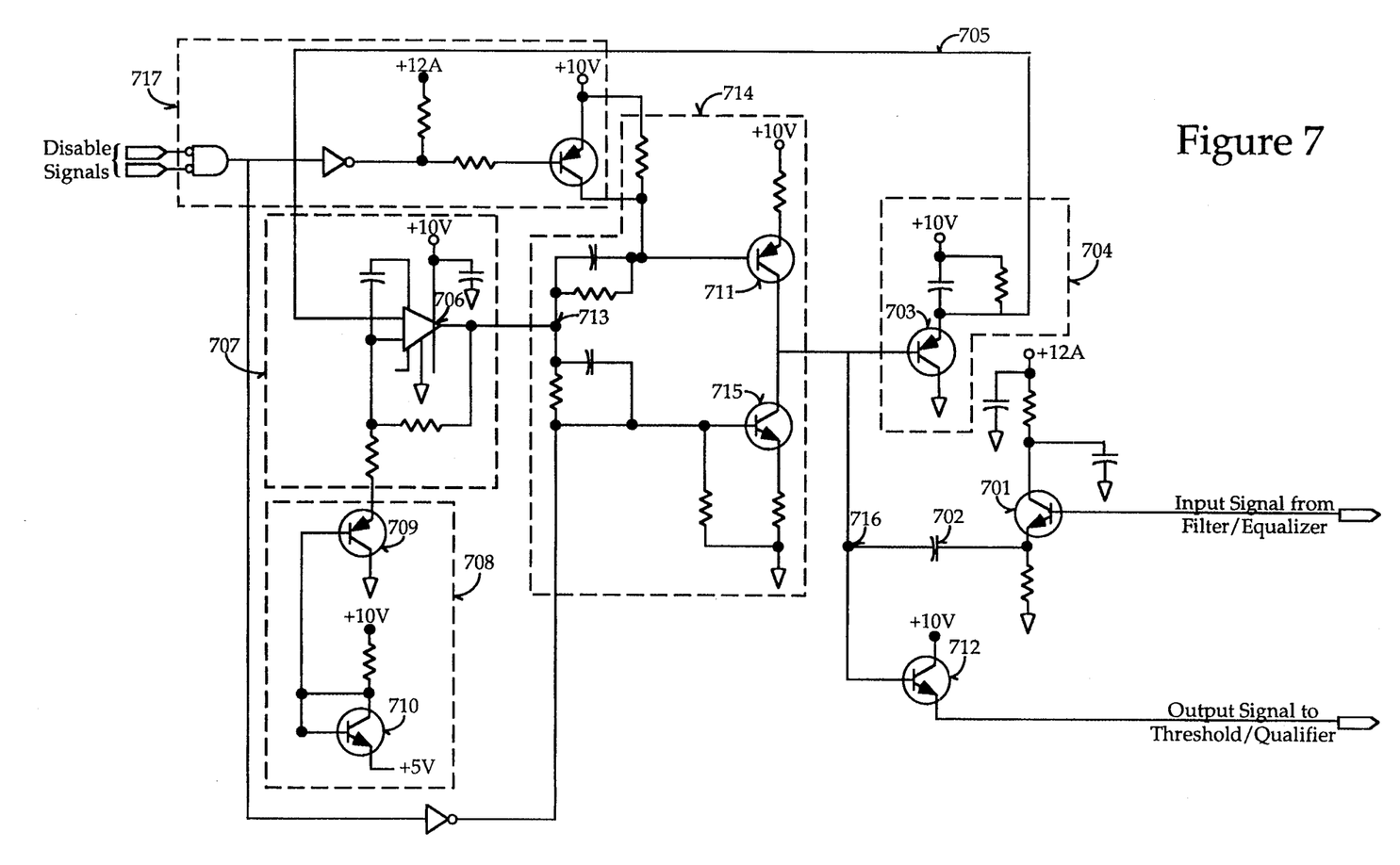
FIG. 7 is a circuit diagram illustrating the currently preferred embodiment of the DC restore circuitry.

FIG. 7 is a circuit diagram illustrating the currently preferred embodiment of the DC restore circuitry. The read signal from the filter/equalizer is input to the base of transistor 701. Transistor 701 acts as an input buffer. The buffered input signal is coupled to AC coupling capacitor 702. The AC coupled signal is input to the base of transistor 703, which comprises part of the negative peak detector 704. The output 705 from the peak detector 704 is input to the difference amplifier 706 of comparator 707. The reference voltage is supplied by block 708 and also input to difference amplifier 706. The two transistors 709 and 710 are implemented to compensate for the two diode drops of transistors 703 and 712.

The amplified difference signal from comparator 707 is coupled to node 713 of charge pump 714. Transistor 711 and 715 either sources or sinks current to node 716 in order to keep the signal peaks at the reference voltage. The output signal from the DC restore circuit at node 716 is buffered by a common-collector transistor 712. The DC restore circuit can be disabled by block 717 during transient periods.

In an alternative embodiment, the present invention could be designed to restore the positive peaks by implementing a positive peak detector. Only those pulses exceeding the threshold would then be qualified.

Thus, a DC restored read channel in an optical recording device is disclosed.

What is claimed is:

1. An optical recording system comprising:
   a laser for emitting a beam used to write data onto an optical medium and to read data stored on said optical medium;
   a lens for focusing said beam onto said optical medium;
   a servo mechanism for controlling an actuator which positions said beam and said lens in order to perform a seek;
   a detector for generating an electrical signal based on said data read from said optical medium;
   a restoration circuit coupled to said detector for restoring said electrical signal to a pre-determined voltage level;
   a qualifier for qualifying said signal according to a threshold voltage level, after said signal has been restored to said pre-determined voltage, wherein qualified pulses of said signal are considered to be valid;
   a filter and an equalizer for filtering and equalizing said signal prior to said signal being restored;
   a differentiator for generating a differential signal from said electrical signal;
   a zero crossing detector for detecting zero crossings of said differential signal, said zero crossings representing peaks of said pulse;
   an AND gate for generating a digital signal based on an AND operation performed on an output of said zero crossing detector and said qualifier;
   a peak detector for detecting said peak voltage levels of said pulses;
   a means for setting a reference voltage at said pre-determined voltage level;
   an adjustment means for adjusting a charge on a capacitor in order to maintain the peaks of the pulse at said pre-determined voltage level, wherein said charge is decreased if said peak voltage levels are greater than said reference voltage level and said charge is increased if said peak voltage levels are less than said reference voltage level.

2. The optical recording system of claim 1, wherein said restoration circuit further comprises a difference amplifier for amplifying a difference voltage between said peak voltage levels and said reference voltage level.

3. The optical recording system of claim 2, wherein said signal is inverted and said peak detector detects negative peaks of said signal.

4. The optical recording system of claim 3, wherein said adjustment means comprises a charge pump having a PNP transistor which sources current to said capacitor if said peak voltage levels are less than said reference voltage level and an NPN transistor which sinks current from said capacitor if said peak voltage levels are greater than said reference voltage level.

5. The optical recording system of claim 4, wherein said threshold voltage level is midway between said peak voltage levels and a baseline voltage level of said signal after said signal has been restored.

6. The optical recording system of claim 5, wherein said reference voltage level is approximately 5 volts.

7. An optical storage system comprising:
   a means for generating a light beam used to write data onto an optical medium and to read data stored on said optical medium;
   a means for focusing said light beam onto said optical medium;

a means for positioning said light beam from one track of said optical medium to a different track of said optical medium;

a means for converting data read from said optical medium into an electrical signal;

a means for setting said electrical signal to a pre-determined DC level;

a means for qualifying said electrical signal which has been set to said predetermined DC level;

a means for inverting said electrical signal;

a means for detecting negative pulse peaks of said electrical signal;

a means for setting a reference voltage;

a means for adjusting a DC level of said electrical signal according to a difference in voltage between said negative pulse peaks and said reference voltage.

8. The optical recording system of claim 7 further comprising:

a means for differentiating said electrical signal which has not been set to said pre-determined DC level;

a means for detecting zero crossings of a differential signal;

a means for generating an output signal based on said zero crossings and said differential signal pulses of said electrical signal which have been qualified.

9. The optical recording system of claim 8 wherein said means for setting said electrical signal to said pre-determined DC level further comprises a means for amplifying said difference in voltage between said negative pulse peaks and said reference voltage.

10. The optical recording system of claim 9 further comprising:

a means for equalizing said electrical signal;

a means for filtering said electrical signal;

a means for controlling a gain of an amplifier used to amplify said electrical signal.

11. The optical recording system of claim 10, wherein said negative pulse peaks are qualified by determining which of said negative pulse peaks are less than said threshold voltage.

12. The optical recording system of claim 11 further comprising a means for disabling said means for setting said electrical signal to said pre-determined DC level.

13. In an optical recording system, a method of detecting valid pulses of an electrical signal which comprises data read from an optical medium, said method comprising the steps of:

differentiating said electrical signal to produce a differential signal;

detecting zero crossings of said differential signal;

adjusting said electrical signal to a constant DC level;

setting threshold voltage level used to qualify said electrical signal;

qualifying said electrical signal according to said threshold;

determining whether each said pulses are valid, wherein a pulse is valid if a zero crossing is detected for said pulse and said pulse is qualified;

inverting said electrical signal to generate an inverted electrical signal:

detecting negative peak pulses of said inverted electrical signal:

generating a reference voltage level;

determining a difference in voltages between said negative peak pulses and said reference voltage;

adjusting a charge of a capacitor according to said difference in voltages, wherein said charge is increased if voltage levels of said negative pulse peaks are less than said reference voltage level and said charge is decreased if said voltage levels of said negative pulse peaks are greater than said reference voltage level.

14. The optical recording system of claim 13 further comprising the steps of equalizing and filters said electrical signal prior to said differentiating and adjusting steps.

15. The optical recording system of claim 14 wherein said adjusting step further comprises the step of amplifying said difference in voltages between said negative peak pulses and said reference voltage.

16. The optical recording system of claim 15, wherein said threshold is set approximately half way between positive pulse peaks of said inverted signal and a baseline of said inverted signal.

17. The optical recording system of claim 16, wherein said reference voltage is set at approximately 5 volts.

* * * * *